United States Patent
Wren (10) Patent No.: US 7,624,044 B2
(45) Date of Patent: Nov. 24, 2009

(54) SYSTEM FOR MARKETING GOODS AND SERVICES UTILIZING COMPUTERIZED CENTRAL AND REMOTE FACILITIES

(76) Inventor: Stephen Wren, 6 Monarch Trace Ct., #102, Chesterfield, MO (US) 63017

(*) Notice: Subject to any disclaimer, the term of this patent is extended or adjusted under 35 U.S.C. 154(b) by 939 days.

(21) Appl. No.: 08/650,834

(22) Filed: May 20, 1996

(65) Prior Publication Data

US 2003/0046186 A1 Mar. 6, 2003

Related U.S. Application Data (63) Continuation-in-part of application No. 08/268,309, filed on Jun. 29, 1994, now abandoned, which is a continuation-in-part of application No. 08/264,184, filed on Jun. 22, 1994, now abandoned, which is a continuation of application No. 08/051,743, filed on Apr. 22, 1993, now abandoned, which is a continuation-in-part of application No. 07/855,099, filed on Mar. 20, 1992, now abandoned.

(51) Int. Cl.
*G06Q 30/00* (2006.01)
(52) U.S. Cl. .......................................... 705/26; 705/37
(58) Field of Classification Search ................ 395/226; 705/26, 27, 1, 37; 709/201, 204, 217, 218, 709/219, 227; 707/1, 5, 4, 6
See application file for complete search history.

(56) References Cited

U.S. PATENT DOCUMENTS

| | | | |
|---|---|---|---|
| 4,359,631 A | | 11/1982 | Lockwood et al. |
| 4,567,359 A | * | 1/1986 | Lockwood ................ 395/226 |
| 4,724,521 A | | 2/1988 | Carron et al. |
| 4,799,156 A | | 1/1989 | Shavit et al. |
| 4,845,636 A | * | 7/1989 | Walker ..................... 384/479 |
| 4,972,463 A | | 11/1990 | Danielson et al. |
| 4,984,155 A | | 1/1991 | Geier et al. |

(Continued)

FOREIGN PATENT DOCUMENTS

WO    WO 97/41688    11/1997

(Continued)

OTHER PUBLICATIONS

"Interactive Media & Marketing: Making moves on the Internet," Advertising Age, V66, 12, pp. 22,24, Jan. 9, 1995.*

(Continued)

*Primary Examiner*—James Zurita (57) ABSTRACT

A system and means for facilitating transactions between central and remote facilities utilizes electronic communications devices, and computing equipment for concurrently or nonconcurrently transmitting voice, music, audio, data, images, video, optic information, and/or signals. Such systems are used to market, sell, finance, and insure goods and/or services. A study of these systems shows that they fall short because none of them take all types of customer personalities into consideration. A system is needed which provides the customers with more latitude and fewer limitations in shopping for goods and services, or for engaging in business transactions. Such a system and means are provided herein, which meet the needs and desires of independent customers, more dependent customers, and a third, or passive, group of customers. All customer types can at anytime request help from a centrally staffed live attendant.

36 Claims, 1 Drawing Sheet

U.S. PATENT DOCUMENTS

| | | | | |
|---|---|---|---|---|
| 4,992,940 A | * | 2/1991 | Dworkin | 705/26 |
| 5,025,373 A | * | 6/1991 | Keyser, Jr. et al. | 705/42 |
| 5,031,214 A | * | 7/1991 | Dziewit et al. | 380/23 |
| 5,032,989 A | | 7/1991 | Tornetta | 705/1 |
| 5,063,440 A | | 11/1991 | Hong | |
| 5,063,989 A | | 11/1991 | Powell et al. | |
| 5,142,566 A | | 8/1992 | Meschi | |
| 5,164,980 A | | 11/1992 | Bush et al. | |
| 5,164,982 A | | 11/1992 | Davis | |
| 5,191,410 A | * | 3/1993 | McCalley et al. | 725/114 |
| 5,202,827 A | | 4/1993 | Sober | |
| 5,231,571 A | * | 7/1993 | D'Agostino | 705/36 |
| 5,239,462 A | | 8/1993 | Jones | |
| 5,243,515 A | | 9/1993 | Lee | |
| 5,267,148 A | | 11/1993 | Kosaka et al. | |
| 5,283,637 A | | 2/1994 | Goolcharan | |
| 5,283,731 A | | 2/1994 | Lalonde et al. | |
| 5,319,542 A | * | 6/1994 | King, Jr. et al. | 705/27 |
| 5,347,632 A | * | 9/1994 | Filepp et al. | 709/22 |
| 5,351,186 A | | 9/1994 | Bullock et al. | |
| 5,392,400 A | | 2/1995 | Berkowitz et al. | |
| 5,451,998 A | | 9/1995 | Hamrick | |
| 5,469,206 A | * | 11/1995 | Strubbe et al. | 348/7 |
| 5,576,951 A | * | 11/1996 | Lockwood | 705/27 |
| 5,606,496 A | * | 2/1997 | D'Agostino | 395/226 |
| 5,724,424 A | * | 3/1998 | Gifford | 705/79 |
| 5,734,823 A | * | 3/1998 | Saigh et al. | 709/229 |
| 5,794,207 A | | 8/1998 | Walker et al. | |
| 5,794,217 A | | 8/1998 | Allen | |
| 5,819,092 A | * | 10/1998 | Ferguson et al. | 717/113 |
| 5,845,265 A | | 12/1998 | Woolston | |
| 5,899,982 A | * | 5/1999 | Randle | 705/35 |
| 6,055,514 A | | 4/2000 | Wren | |
| 6,269,343 B1 | | 7/2001 | Pallakoff | |

FOREIGN PATENT DOCUMENTS

WO      WO97/41688 A1 * 11/1997

OTHER PUBLICATIONS

Kueny, Barbara, "Multimedia Systems Add Hype to In-Office Presentations, Despite Skepticism", The Business Journal—Milwaukee, vol. 8, No. 4, 7 pages, Nov. 1990.*
Unknown, Dialog File 16 (Gale Group PROMT(R)), No. 2092829, "Coming Soon to an ATM Near You: Video NCR: To Supply video capabilities to ATMs of Huntington Bancshares", Bank Technology News, 3 pages, Feb.1992.*
Barthel, Matt, Live, from Huntington—24-Hour Video Bankers, The American Banker, Technology News, pp. 3, Dec. 1991.*
Barthel, Matt, "New uses for debit cards emerge; video conferences and mini cash machines offered", American Banker, vol. 156, No. 235, pp. 3, Nov. 1990.*
Anonymous, "Services: AT&T provides compass", Communications International, Jul. 1993, vol. 20, No. 7, p. 6.*
Anonymous, "Prodigy services add Offerings", Wall Street Journal, Mar. 18, 1991, 1 page.*
Anonymous, "Internet Shopping Network launches Interactive Home Music Shopping service with intouch group, inc. for Internet Users Worldwide; online service features more than 40,000 music titles in 21 genres.", Business Wire, Apr. 11, 1995, 2 pages.*
Karen Gullo, Technology News, p. 3, "Unmanned and Compact, Kiosks Help Sales Efforts", Mar. 5, 1991, American Banker; pp. 1-2.
Barbara Kueny, "Multimedia systems add hype to in-office presentations, despite skepticism", Nov. 1990, pp. 3-5, The Business Journal Magazine.
Author: Unknown, "Coming Soon To An ATM—Near You: Video", pp. 1-2; Feb. 1992, Bank Technology News.
Matt Barthel, Technology News; p. 3, "Live, from Huntington—24-Hour Video Bankers", Dec. 20, 1991, American Banker, pp. 1-2.
Matt Barthel, Technology News; p. 3, "New Uses for Debit Cards Emerge, etc. . . . ", Dec. 9, 1991, American Banker, pp. 1-3.
Tony Gandy, The Banker, "Technology: the impersonal touch (banks without staff?)", Mar. 1993, Article 19, pp. 1-3.
Matt Barthel, Technology News; p. 3, Chase Attempts Sales Via Full-Motion Video, Aug. 18, 1993, pp. 1-3.
Lewis Knox, "Video banking heads toward prime time", Institutional Investor, N.Y.; May 1993; pp. 1-2.
Interactive, "Making Moves on the Internet", Advertising Age; Jan. 9, 1995, pp. 22 and 24.
Smith, Charles W., article entitled, "Auctions, The Social Construction of Value", pp. 2, 3, 64, 65, 164, 165, 168, 169, and pp. 170-173, (1989) University of California Press, Los Angeles, California.
Notess, G. R., articled entitled, The Low-End Power User: Using the Internet via a Dial-Up Account, Nov. 1993 Online 89.
John Viescas, Official Guide to Prodigy Service, Microsoft Press, 1991, ISBN 1-55615-374-0, Ch. 6, pp. 210,217,220 and 227, 7 pages.
Williams, Bob et al, entitled Verity Announces Topic Real-Time and Strategic Alliance With Dow Jones & Co, Business Wire, New York; Apr. 23, 1990. Sec. 1. p. 1, Verity, 3 pages.
Don Oldenburg, Making the Right Connection, The Washington Post (pre-1997 Fulltext), Washington, DC; Jan. 29, 1992. p. b.05/Right Connection, 3 pages.
Bob Bruce, entitled Home-Based Banking Slowly Catching, Boulder County Business Report, Boulder, CO, Oct 1989; vol. 8; Iss 9; Sec 1, p. 6, 4 pages.
Anonymous author, New Competitor for Prodigy, Catalog Age, New Canaan: Aug. 1991. vol. 8, Iss 8; p. 38, accessed via Proquest on Oct. 20, 2003/New Competitor for Prodigy, 1 page.
Michael Pollick, Online Services Get on Track, The Sun, Baltimore, Aug. 11, 1991, p. 1/Online Services, 3 pages.
Michael Banks, How to Determine Which Personal Online Service is Right For You, Medford: Mar./Apr. 1993. vol. 10, Iss 2; p. 20, 5pgs.
Len Filppu, Software Publishing Corp. Unveils New Support Warranty Policy, Business Wire, NewYork, Aug. 26, 1993/Support Policy, 3 pgs.
Karen Cheseby, et al, What the Analysts Say, The Washington Post, Washington, DC: Aug. 23, 1993. p. F.33, 3 pgs.

* cited by examiner

Fig. 1

SYSTEM FOR MARKETING GOODS AND SERVICES UTILIZING COMPUTERIZED CENTRAL AND REMOTE FACILITIES

CROSS REFERENCE TO RELATED APPLICATIONS

This application is a continuation-in-part of U.S. application Ser. No. 08/268,309, filed Jun. 29, 1994 now abandoned which was a continuation-in-part of Ser. No. 08/264,184, filed Jun. 22, 1994 now abandoned. That application was a continuation-in-part of Ser. No. 08/051,743, filed Apr. 22, 1993 now abandoned, which in turn was a continuation-in-part of Ser. No. 07/855,099, filed Mar. 20, 1992 now abandoned, all of which are incorporated herein by reference.

FIELD OF THE INVENTION

The present invention generally relates to a system and means for establishing a communicating link between remote facilities. More particularly, the invention is concerned with a system and means for facilitating transactions between central and remote facilities utilizing electronic communications devices, and computing equipment for concurrently or non-concurrently transmitting voice, music, audio, data, images, video, optic information, and/or signals. Such systems will be used to market, sell, finance, and insure goods and/or services.

BACKGROUND OF THE INVENTION

Over the years, the marketing of certain financial services, and, in general, in the marketing of other goods and services, has been hindered increasingly by such problems as high administrative costs, long delays in creating and implementing services, and complex methods that confound and confuse those at retail sales locations as well as their customers. These problems have been especially prevalent in the financial services industry.

The traditional approach to marketing financial service products has been to offer such services at retail sales locations by employees of the retail businesses acting as agents for the financial services companies. One of the consequences of this traditional approach is that each retail sales business must have the necessary means for calculating or computing and quoting rather complicated matters, such as payments and premiums, and to be responsible for maintaining computer hardware and software systems independently of and in addition to those at the financial service companies. All too frequently these requirements result in contracts which must be amended, endorsed, or worse, completely rejected.

Another consequence of this traditional approach is that in acting as agents of the financial services companies, the employees of the retail sales businesses are usually required to be licensed in their state to do so. High turnover rate of these employees can pose serious problems. Further, there are considerable costs for the retail sales businesses in maintaining separately these in-house systems, and for replacing them to keep pace with changing products and regulations.

An ideal system would utilize central and remote locations working together to overcome such problems. Such systems have been tried, but they have not been totally satisfactory. One of the first to use central and remote facilities was Lockwood in U.S. Pat. No. 4,567,359. By Lockwood each remote terminal was programmed to elicit information in a predetermined sequence from a customer, and to transmit that information to a central processing center. This was done in a fashion similar to a programmed course. Lockwood obtained the required information by means of simulated interviews with a fictitious agent created by audio-visual devices. The information obtained was merely input for use in Lockwood's program, and the customer had no latitude. Using that approach a customer was asked pertinent questions in order to learn the type of insurance desired and other information necessary to process a quotation.

At a central terminal the information was processed and the results were transmitted back to the remote terminal. The customer was then given an opportunity to select a policy or take it home for study. These were his only options. In Lockwood the customer terminal was there for the purpose of satisfying the central processing center, and not for assisting the customer.

In U.S. Pat. No. 5,231,571 D'Agostino referred to Lockwood, and rejected the Lockwood method because the customer had no say, pointing out that Lockwood's remote computers greatly reduced labor costs, but the reduction of such costs was at the expense of completely removing the human interface. To overcome this problem D'Agostino provided a computerized system which included a personal representative, or financial assistant, at a central terminal. Each customer terminal stored all financial information, and a display was provided at each of those terminals so that the central representative could display selected information. Thus, a central terminal was linked to a customer terminal, but the display, and all of the information at the customer terminal, were controlled at the central terminal. The output was controlled by a representative at the central terminal in response to one-on-one conversations between the customer and the representative. The customer had no computer, and D'Agostino did not want him to. The customer was to converse and not use a terminal. Neither Lockwood nor D'Agostino, then, completely solved the problem existing between remote and central facilities.

In U.S. Pat. No. 4,992,940 Dworkin also dealt with a facility having a remote and central facility, providing a remote system for locating the best available prices for products or services. For the remote facility Dworkin used a series of screens, tests and templates designed to elicit the desires of a customer. The customer selected options in multiple choice fashion or filled in blanks in templates. When the series was completed the customer's desires relative to goods, their sources and prices, was to have been obtained for use at the central facility. The resulting information desired by the customer was then transmitted back to the customer after being processed.

Another remote transaction system, disclosed in U.S. Pat. No. 4,845,636 to Walker, provided a transaction booth located remotely from an operations center. It was used for facilitating such transactions as renting automobiles. The booth and center were connected by audio and video equipment used for transmitting audio and video signals from the customer in the booth to the agent at the operations center in order to negotiate a transaction. The customer in this instance knew what he wanted. He was not shopping, but merely seeking to effect a predetermined transaction.

A review of this prior art shows that all of these systems fall short because none take all types of customer personalities into consideration. In the course of several years of teaching computer classes I developed a theory regarding human interaction with computers which was partially the basis for the system provided herein. From my observations of students I found that there were three classifications of human attitudes toward the use of computers. The first group preferred to be left alone when using computers and wanted to work things out on their own. This group tended to be very independent and to them the unrequested assistance of a representative was an intrusion. This independent group needed an input device operating in a self-service mode.

A second group wanted to be told what they needed to do, and thereafter would help themselves. This dependent group needed the assistance of a live attendant in conjunction with an input device. Such customers, thereafter, would help themselves.

A third group of students wanted to be shown what to do every step of the way. This group wanted to be allowed to sit back and passively watch whatever was being presented. This passive group required a live attendant who could take control of the system.

It is to be appreciated that none of the references discussed hereinbefore satisfy all types of customers. The invention herein takes all three types of customers, the passive, the dependent, and the independent customers into consideration, and provides a system that any of the three can use. This is not true of the prior art, even when combined. Consequently, a need still exists for new and improved systems utilizing central and remote facilities. The need is for a system which provides the customers with more latitude and fewer limitations in shopping for goods and services, or for engaging in business transactions. Such a system and means are provided herein.

OBJECTS OF THE INVENTION

The principal object of the system and means of the present invention is to facilitate transactions, especially financing, for customers at remote locations, including transactions for car, truck, boat and motorcycle dealerships, department stores, public locations such as shopping malls, auction houses, airports, grocery stores, and real estate offices where customers can shop for homes. Especially important transactions are those in computer stores, homes, factories, and office buildings where a consumer or customer wishes to obtain product information or perform a transaction on the site.

Another object of the invention is to provide a means whereby auction houses at remote locations can be concurrently linked with one or more central facilities or auction houses so that groups of customers at each remote or local auction facility can participate in the actual auction at one or more distant central facilities or houses. Auctions taking place throughout the world can be linked so that a customer in Saint Louis can participate and bid in an auction concurrently taking place in Hong Kong or France.

Still another object of the invention is to link a number of terminals to form an electronic shopping store permitting the customer to obtain desired information on the products of his choice while having access to highly knowledgeable representatives. Customers can also record (print or otherwise) selected information for their later review.

Other objects of the invention are to centralize and simplify the responsibilities over products; shorten the time required to create and implement new products in the financial services arena; and to provide a wider variety of products for customers.

SUMMARY OF THE INVENTION

Provided herein is a system which enables a customer to obtain knowledgeable assistance from a central facility and its salesperson or representative. This would be especially beneficial for customers of retail stores which sell large ticket items or complicated products which require or benefit from highly or moderately skilled sales people. This would respond to a common complaint that few stores have knowledgeable staff. The customer can then select and pay for his purchase at the terminal and take possession of his goods upon leaving.

As emphasized the system for marketing products and services herein includes a customer computerized communications facility, a central computerized communications facility remote therefrom, and a data link between them. An improvement herein is that computer means are provided at both the customer computerized communications facility and the central computerized communications facility, adapted to transmit and receive images and data from one to the other. Means also establish voice contact between the two communications facilities. A database is located at the central computerized communications facility containing products and services information. Input means at the customer computerized communications facility are adapted to enable a passive type of customer to access that database in order to view a presentation established to educate the customer about goods and services. Input means are also adapted to enable a dependent type of customer to contact a representative at the central computerized facility while at the same time accessing the database, and if desired, bypassing the presentation to go to his desired level of information. The input means are also adapted to enable an independent type customer to proceed to a higher information level and in a self-service mode, to browse through the database to view desired information to learn about goods and services at that level of knowledge. Means are provided enabling all types of customers at any time they desire personal assistance to establish voice contact to talk to a representative at the central computerized communications facility. Input means located at the customer computerized communications facility and application software located at the central computerized communications facility enable either type of customer to download from the central computerized communications facility to the customer computerized communications facility information, for instance prices and contracts, desired by the customer.

THE INVENTION

The approach of this invention is to permit passive, dependent, and independent customers to shop electronically in the fashion they are accustomed to, that is, as though they were using the yellow or white pages or were shopping in a mall. The system thus adapts to customers rather than requiring customers to adapt to the system.

The problem with the prior art is that it failed to recognize that the public they were dealing with is a generation accustomed to television. They were not accustomed to having to read large amounts of text and would no longer accept that approach. This failure on their part greatly explains their poor results and why the public refused to accept their antiquated methods. The use of computerized voice is significant. The prior art is limited generally to transmitting only text and perhaps a few graphics, requiring that the customer read a great amount of text to get the information he wanted. In contrast, the system of the present invention understands these preferences and has adjusted the system accordingly to accommodate the present generation.

A disadvantage of text is its limited ability to convey enthusiasm, emotion, and in general meaning. There is much contained in human speech in terms of inflection, tone, and volume which convey a significant part of the idea intended. Consider that a particular sentence can when spoken one way be a compliment, yet when spoken with different inflection it becomes an insult. As illustrated, text seldom conveys these colorful aspects of speech and can never succinctly convey a complex thought or idea entirely. Even worse results can be obtained when translating from one language to another. Text only approximates speech. It does not replace it as the forerunners of these systems assumed. For this reason this system's use of computerized voice provides surprising and superior results.

For the receptivity of passive customers presentations are transmitted to his computer screen utilizing well known and respected individuals who will describe and explain the features and advantages of the products offered. Another approach is to transmit to the customer's screen a program including a panel of experts to review a variety of products while comparing their features for the benefit of the customer.

In addition, for the passive type customer narration can be played on the customer's speakers. And preferably the voice to be transmitted will be digitized. The reason for using digitized voice is that typically synthesized voice lacks the color and qualities of the human voice. There can be cost benefits in using synthesized versus digitized voice, because synthesizing eliminates the need to hire a professional narrator, and because the script can be transmitted and synthesized at the customer location. In some cases, too, limitations on a network can make the use of voice synthesis necessary. However, since the system will be used for marketing and selling, it will be beneficial to provide the most convincing and professional narration possible. Therefore where possible the preferred approach is to transmit digitized voice.

It is preferred that as the program or commercial is presented the system be adapted to display simultaneously the text of that narration somewhere on the customer's screen. This provision has multiple purposes, one being that some customers can be hearing impaired and the system will need some way of delivering the message to that customer. Another reason is that one problem with audio is its linear aspect. If while listening to the audio portion the customer misses or misunderstands a section he cannot readily determine what he missed except by replaying the entire narration clip. Whereas, if we include the text at, for example, the bottom of the screen the customer will be able to quickly zoom in on those portions that were unclear to him.

The information provided for the passive customer can be accompanied by background music as is customary for presentations. The system can as well determine appropriate music based on a customer's profile or can allow the customer to select his music by category or artist. In this way an otherwise flawless presentation would not be jeopardized by inappropriate music the customer can find uninteresting or annoying.

As an inducement for passive type customers to use the system they can be provided a collection of entertainment-based programming. This can include movies, games or other popular forms of audio and video entertainment. In return for presenting this information to the customer they will be presented, from time to time, a collection of commercials of those firms who sponsor the entertainment-based programming. These commercials can be shown intermittently during entertainment viewing or as a customer waits for live assistance. In determining which commercials the customer is to view the system could use demographic information of each customer to electronically determine which commercials are appropriate for a given customer. This database of stored demographic information could be periodically updated by prompting customers during their use of the system for personal information or preferences. Demographic information can also be collected by merely recording the responses of each customer as they use the system and building from it a customer profile which can thereafter be used to select appropriate commercials for each customer. The advantage of this approach is that without this technique customers are blindly shown commercials that can be inappropriate thereby wasting both the customer's time and the advertiser's money.

In another approach each customer can watch a specified number of minutes of commercials and a given number of minutes of entertainment programming. Computer means can be utilized to keep track of each customer's account. Alternatively, customers can elect to bypass some or all commercials and instead pay for their entertainment programming. While watching commercials, customers will have the opportunity to request additional information on selected products. In return their accounts could be credited for this additional commercial time to satisfy the customer's required minutes of commercial viewing. This means permits sponsors to reach only those system users who are most likely to have a need for their products.

Referring now to the equipment, it will be appreciated that the overall system means will be the same. The equipment will just be used more by the independent customer, somewhat less by the dependent customer, and even less by the passive customer. At the remote retail sales facility an area is established where an array of electronic communications and computing equipment is provided in accordance with the present invention for transmitting and/or receiving information comprising images, video, audio, music, voice, and data about financial services or other goods and services between the central financial services facility and the customer at the remote facility. In addition, in order that a representative at the central location can communicate with the customer, a complementary array of electronic communications and computing equipment is located at the central location. A speaker phone is also contemplated herein, intended to encompass other comparable devices, such as a video phone or the like, where in addition to 2-way verbal contact the customer can establish 2-way or 1-way visual contact with the representative at the central facility. Concurrently or subsequently the remote terminal can transmit its phone number, serial number, or identification code to the central facility so as to identify itself and thus satisfy any future administrative needs of the central facility should for example a break in communications occur and the need arise to reestablish contact with the specific remote facility and its customer.

Each of these components of the respective electronics communications equipment at the respective facilities is per se a conventional off-the-shelf item and thus it is not necessary to describe such components in any further detail. As an example, speakers at the customer site can be mounted at various locations. A preferred approach is to mount them at approximately ear level. As another approach, the speakers can be mounted from above with a dome placed above the speakers. The benefit of this is that the customer will be surrounded with a wall of sound giving the impression that he or she is inside the system. It should help create a heightened sense of realism that can be very instrumental for certain products such as travel services.

The central facility will have no physical presence at the remote facility. In general substantially all application software will be located at each central facility, and programs there will prompt the customer for input, choices, or preferences so that the customer will contact the central facility and then indicate those choices or preferences. Certain software at the central facility can be downloaded to the remote location to provide proper control and support for the customer. Such downloaded software can be stored temporarily at the remote facility to be used only in the current session, or it can be retained for future sessions. It can provide for the simple updating of any needed communications or other remotely located software at the remote facility and ensure that each remote location will be compliant with future standards of communication and protocol based upon changing needs and industry standards. It can also be beneficial to quickly download a catalogue of desired or requested information to permit the customer to review leisurely while terminating the communication link to reduce connect charges or free utilization of the central facility's resources. The customer can then reestablish contact with the previous or a new representative and central facility when he is ready. To facilitate such a technique the remote or central location can record the stopping point of the customer's last on-line presentation so that when contact is resumed an appropriate presentation continuing point can be ascertained. The storage of all product information at the central facility means that all activities including product information about these goods and services are centralized at the central facility. It should be understood however that certain minor information can be stored at remote facilities such as directories of facilities for dialing purposes or a data base of providers of goods and services arranged by category of business or products offered such as in the Yellow Pages phone directory. In addition information of a lesser or unrelated nature can be stored at the remote facility to attract or induce customers to use the system.

DETAILED DESCRIPTION OF THE INVENTION

Having described the invention in general terms, it remains to exemplify the invention by way of a specific embodiment in conjunction with a drawing.

In that sense an electronic phone book may be stored at the remote facility or instead upon pressing or utilizing the touch screen, keyboard or input device the customer may activate the system causing it to retrieve from a central facility a directory of goods and services available and thus permitting the customer to select another central facility from a displayed list or catalogue and establish contact with it and thus have access to numerous central facilities and a myriad of goods and services.

BRIEF DESCRIPTION OF THE DRAWINGS

In the following detailed description, reference will be made to the attached drawing in which.

DETAILED DESCRIPTION OF THE INVENTION

Figure 1:
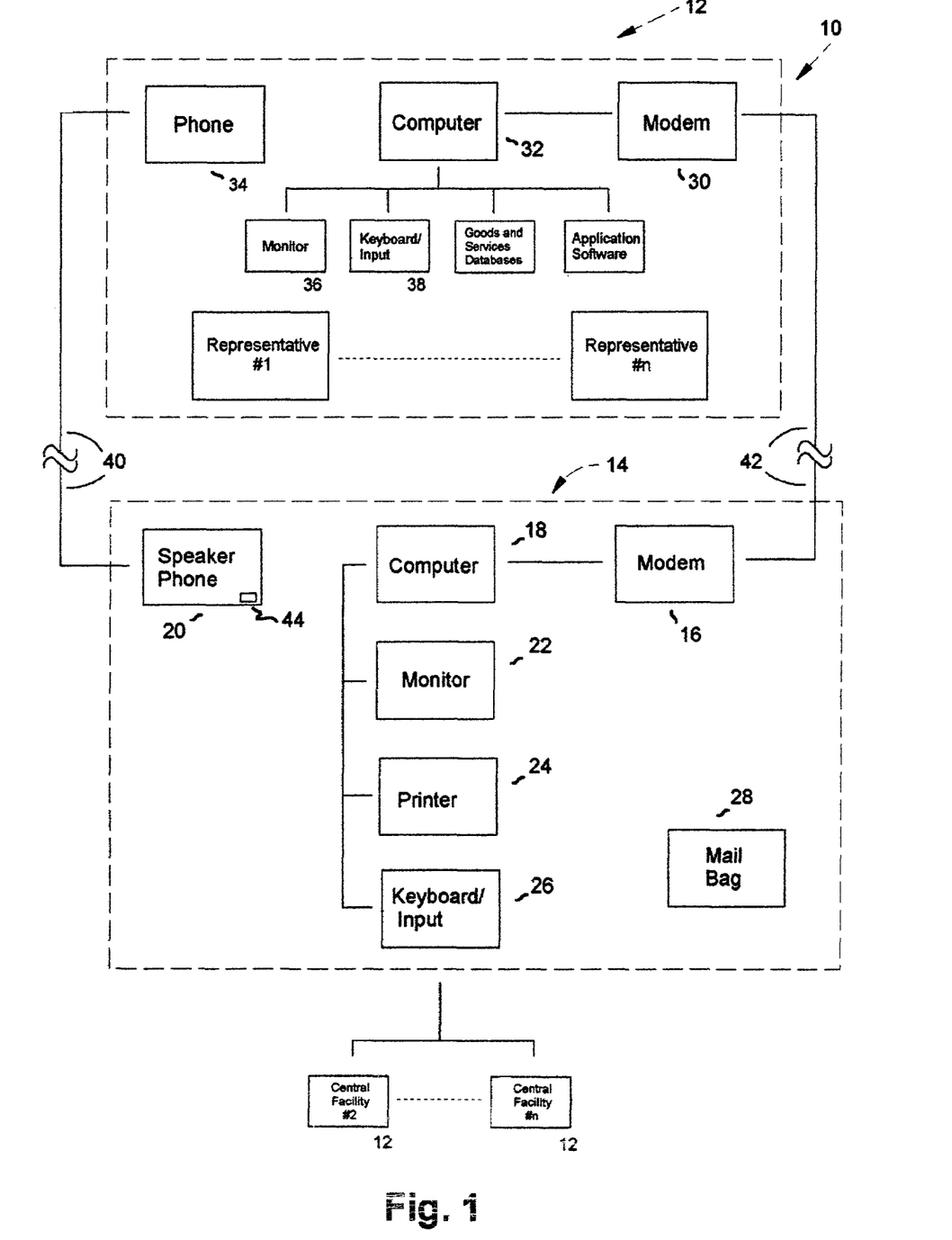
FIG. 1 is a block diagram of an array of electronic communication devices and computing equipment employed in a system and means for facilitating transactions in accordance with the practice of this invention.

The preferred embodiment of a system 10 and means for facilitating transactions in accordance with the principles of the present invention will now be described in detail. The transactions facilitating system 10 includes at least one central facility 12, such as a financial services company, marketer, or manufacturer and at least one remote facility 14, such as a retail sales facility, or any other public or private location from which a potential customer of the central facility 12 can wish assistance in facilitating a transaction. For instance, the remote facility 14 can be a retail sales facility, such as a car, truck, boat and/or motorcycle dealership. The central financial services facility 12 can be a bank, credit union or a finance company for the purposes of illustration, since any central facility from which a customer can wish assistance in facilitating a transaction will utilize the invention.

As seen in FIG. 1, an exemplary remote facility 14 has equipment which includes a modem 16, a digital computer 18 or other means for processing information, instructions or data, a phone 20 or other means for exchange of audio transmission, a monitor 22, a printer 24 and a keyboard or other input device 26.

FIG. 1 further shows an exemplary central communications facility 12 including computer 32 having monitor 36, keyboard/input means 38 as well as Goods and Services Databases and Application Software. As discussed in greater detail herein, a Goods and Services Database includes information of competing goods and services and/or providers of goods and services which may be of interest to the customer at the remote facility. The exemplary central communications facility 12 of FIG. 1 is further shown to have a modem 30 and a phone 34 or other means for exchange of audio transmission. A complementary printer is not needed at the financial services facility 12 for the purpose of facilitating transactions in accordance with the present invention.

Continuing to refer to the schematic illustration of FIG. 1, system 10 shows exemplary central communications facility 12 connected to remote communications facility 14 via links (shown schematically as lines) 40 and 42. Communications link 42 facilitates data communications between computer 32 of central communications facility 12, via modem 30, and computer 18 at remote communications facility 14, via modem 16. Communications link 40 provides for telephonic communication between central communications facility 12 and remote communications facility 14, enabling live communication between a customer at remote facility 14 and a service provider such as a customer service representative at the central communications facility. Preferably, two separate phone lines 40, 42 are available to interconnect the respective phones 20, 34 of the facilities 14, 12 simultaneously with, but separately from, the interconnection of the respective modems 16, 30 of the facilities 14, 12 so that voice or audio, visual, and data communication can be ongoing concurrently between the customer at the remote facility 14 and an agent at the financial services facility 12. Alternatively such contact can be established by coaxial cable such as through a cable company or some other means of establishing contact or by means of some wireless technology such as radio.

Referring again to FIG. 1, it should be noted that the central communications facility 12 shown in the enlarged view is an exemplary embodiment of a central communications facility. Additional central communications facilities 12(#2) through 12(#n) are illustrated in FIG. 1. Each of central facility 12(#2) through 12(#n) can include substantially the same features as shown in the enlarged view for central communications facility 12, including the functionality for communicating audio, visual and data communications over telephone lines or, alternatively, by cable or wireless technology. FIG. 1 shows a schematic line similar to lines 40 and 42 linking central communications facilities 12(#2) through 12(#n) to each other and to remote facility 14, using the communications functionality described above.

In the illustrated case of financial services, the system 10 facilitates the carrying out of activities such as financial business transactions in accordance with the principles of the present invention by employing an array of computer means for transmitting and/or receiving information comprising images, video, audio, voice, music, and/or data between the financial services facility or location 12 and a customer at one of the respective remote facilities or locations 14. The video can be full motion and can comprise still images. The audio can comprise voice, music, and sound effects such as are commonly found in commercials. The information can also include text and graphics. The array of electronic communications and computing equipment includes a modem 16, a digital computer 18, a speaker phone 20 or other means of providing 2way voice contact, a monitor 22 or other means of conveying images, a printer 24 or other means for recording signals or information conveyed from the company 12, and a keyboard or input device 26. Additionally, a mail bag 28 or other means for remitting payment or documents is provided at the remote facility 14.

The customer computerized communications facility includes means for communicating with a number of different central communications facilities.

The financial services facility 12 offering the goods and/or services or assistance in facilitating such a transaction is established at a central location. Each retail sales or remote facility 14 is sited at a given remote location where potential customers are located whether stationary or portable. In this respect the system can be used to execute a transaction between the customer and the central facility or it can only provide assistance to the customer in his selection of goods and services which a local or remote facility are to thereafter provide.

Having described the central and remote facilities per se, I will now explain their use. At the remote facility 14, the customer of the retail sales facility 14 and/or of the financial services facility 12, is escorted to the area where the above-described array of electronics communications and computing equipment of the retail sales facility 14 is provided. A customer can approach the equipment unescorted, but it is believed that many first time customers will be reluctant to use the system without first being introduced to it by a live attendant. The customer presses an auto dial button 44 on the speaker phone 20 or uses his input device such as a touch screen to select a central facility to contact from a list displayed on his monitor and in doing so establishes contact with the financial services company 12 and perhaps its agent by way of some means of transmitting data, audio, and/or visual information comprising telephone or video phone and permitting the simultaneous or concurrent transmitting of audio, video, and data as the customer and representative speak with one another or establish voice contact and while the representative provides the customer with information about goods and/or services.

Having established contact the customer and agent then speak with one another by way of the phones 20, 34 of the respective facilities 14, 12. Concurrently, the agent by using his or her digital computer 32, monitor 36, keyboard 38 or other input device and modem 30 establishes electronic contact with the customer's modem 16, digital computer 18, monitor 22 and printer 24 if such contact has not already been established by the customer by means of a single telephone or communications line, or wireless means to transmit and provide helpful audio, video, and data information to the customer about the transaction being proposed for the customer by the financial services facility 12. Such information can take the form of charts and the like displayed on the monitor 22 or printed on a sheet of paper by the printer 24.

It is again emphasized that the agent residing at the central financial services company 12 has the ability to control the above-described electronic communications and computer equipment located at the remote facility 14 with the customer present. In addition a digital computer 18 stores suitable well-known off-the-shelf operations, communications and perhaps graphics software programs in its memory and is operational to translate the signals, electronic or otherwise, caused to be transmitted from the financial services facility 12 into such displayed, audio reproduced, recorded, or printed information. The agent is thereby able for example to display any desired information at will on the customer's monitor 22 or to print any information at will on the customer's printer 24. The customer can respond verbally to central facility prompts initiated by the representative or the central facility equipment via the speaker phone 20 or by using his or her keyboard 26 or other input device or some other means to convey customer supplied information.

In addition to the display capabilities, to enable the passive customer to replay any desired portion of his presentation, an icon appears on the screen so that the passive customer can recall portions without having to use a keyboard. By using the icon the customer can cause the system to repeat that portion of audio which he desires to hear again. In fact, the icon can be the text itself.

The passive type customer may prefer, as an input device, a touch screen, permitting him or her to press a screen display to obtain his choices. In addition to that type of input, voice activated responses, that is, voice input will permit him to speak his responses or selections in order to input his data. Personal data to be supplied by the customer thus can be voice input or by other appropriate means, such as a personal data card, or a magnetic reader or other comparable device capable of retrieving information. The system can then permit the customer to update or correct any information provided.

One advantage of using a touch screen is that if a customer prefers to help themselves yet needs to enter alpha numeric data such as their name, address or other data the system can temporarily display on the screen a template of a keyboard the customer can then use to key in their response. This means can also be used to allow the customer to type in keywords to initiate a search. It then eliminates the need for a keyboard at the customer location and it is felt that when used sparingly will be more acceptable to customers than a keyboard. For occasions that require significant keying, the customer can request a rep who can key the data for the customer.

Referring now to the dependent type of customer, it is anticipated that a handset rather than a speaker phone or external speaker can be used to enable the customer to speak privately with a representative. For an application of this system the input device can be a television remote control device perhaps with alterations comprising cursor movement keys, a joystick, or a microphone for input. In recording this product information the customer can then save or take the desired information with him for his later review. The material can include instructions for use and operation, in addition to the advise of the live representative. It can also include a list of suggested products or services downloaded from the central facility computer. At any time the customer can also call for prepared presentations to better prepare him for a session with a representative. The system will educate the customer on the goods and services he is about to consider, and it will also permit him to bypass introductory presentations and immediately direct the session. He can also request personal assistance from a representative if he desires it at that point. Any information he desired can be recorded on paper, magnetically such as upon a cassette, video tape, computer disc, CD, or on a chip or smart card. At the same time the central facility can record the transaction for later retrieval so the customer can continue where he left off at a later date should his interest renew. The information can also be stored at the central facility for the purpose of later identification, or in case it is needed to resolve possible disputes.

The third type of shopper, the independent or independent type customer, can establish contact with the central facility's equipment without the assistance of a representative, and merely help himself in a self-service mode to databases which he can browse through for the goods or services which interest him. The information available to this customer will include audio and visual information related to those goods and services of interest to the customer and can contain any desired sales or product information such as product specifications, service data, published articles, product demonstrations, orchestrated presentations, sales literature such as you might find in a brochure or catalogue, possible uses, compatibility, styles, selection, availability, comparisons to other products or services, published articles on products or services, product features, compatibility, or requirements. In the case of automobiles or other durable goods information might comprise models, styles, expected life, efficiencies, colors, capacities, maintenance requirements, options, comparisons between models, published articles on products or excerpts of, pictures of products (still and full motion of product as in its various uses), testimonials of products, commercials, or infomercials. The images can include artwork such as photographs of paintings, drawings, or sculpture as a means of making the atmosphere more interesting and attractive. In the case of financial instruments or investments, information can include expected profit or margins, past performance of like products, maturity dates, terms, conditions, exclusions, limitations, and exceptions. The information can also be in the form of contracts.

Once the contracts are printed out the customer is directed to sign them and personally place them and any required payment (check) in a mail bag 28 located at the retail sales facility 14. A binder can be issued upon the customer signing applications for financial services and mailing them so he can take possession of any purchased goods or merchandise in contemplation of the financial services companies accepting the applications and performing final execution of the contracts in the home sovereign. In the application of entertainment the possession can include the presentment of recorded performances or programming to the customer such as can be transmitted or in some otherwise fashion conveyed to the customer. Alternatively, some other means of remitting payment and any completed contracts to the agent can be used such as electronically where the customer can for example endorse an electronic signature box displayed on his monitor by means of an electronic pen or other comparable device and subsequently transmit by modem the electronic contracts back to the central facility or by some other electronic means to permit the customer to legally apply for contracts perhaps comprising the faxing or transmitting of a signed contract from the remote to the central facility.

The system 10 of this invention overcomes such aforementioned drawbacks by centralizing the administration and selling of products and thereby substantially reduces the costs associated with creating, marketing, and administering these products and services. The system 10 also affords the advantage of consolidating almost all management activities of the financial services products with the central office. The primary or only task of the retail sales location in the preferred embodiment is to refer the customer to the equipment at the remote location. Hence, all possible responsibilities are centralized permitting better control and simplifying ongoing management. With the great reduction in costs associated with developing and administering new products it is now possible, that is affordable, to develop a greater variety of products which are then more likely to fit the needs of specific customers.

Examples of information for home users would be information provided when purchasing or renting movies, music, or other forms of entertainment might comprise: ratings, titles, product descriptions, artists or actors, articles written by critics or excerpts of, and short music or movie segments, samples or previews. Other product information includes lists of available products and, in general, any audio or visual information a customer might wish to know including quote, price, or any information about goods or services other than quote, binder, or price. As an assistance to any attendant or representative at the central facility that same or related product information can be displayed on the representative's monitor at the central facility to aid in his assisting the customer.

Another advantage of the invention is that the supporting materials for new products, such as computer programs and other sales materials, are now centralized. It is no longer necessary to train various outside staff members to sell and support the new products. This gives the financial services company or other provider of goods and services more control over the sales process. products. This gives the financial services company or other provider of goods and services more control over the sales process.

The foregoing description of the preferred embodiment of the invention has been presented for the purposes of illustration and description. It is not intended to be exhaustive or to limit the invention to the precise form disclosed. Many modifications and variations are possible in light of the above teachings. As one such modification the information transmitted between the central and remote facility can be compressed using well-known techniques to speed the operation of the system. Conversely, where the means of transmission is sufficient it can be unnecessary to compress the information before transmitting which can eliminate or reduce computing power at the customer location.

As another variation of the invention, whereas the remote facility normally initiates contact with the central facility, it is contemplated that the central facility or its representative can have occasion to initiate contact with a given remote facility. An example would be for use in a public or private location where the central system would contact the remote facility to apprise potential customers of goods and services offered such as with special offers or new product introductions. In a public location such as at a mall a remote terminal can perform for customers who pass and prompt them to press the screen to obtain specific information.

In another modification the system can utilize voice synthesis to prompt or present options to the customer and can be used in tandem with visual prompts. By this means the customer can at his leisure and without the assistance of the representative review any desired information about those goods and services he is most interested in with complete privacy yet can by way of his input device request a representative at his will should he desire personal service. In this fashion the customer can serve himself should he wish or if preferred he can sit back and let the representative fully control the presentation. The transmitted presentation can utilize a well-known spokesperson and give the appearance of a commercial or infomercial. On his own the customer can back up, fast forward, skip, or jump to the specific product information he wishes at his command. His access to this information would be described in the computer industry as random.

Information can be provided at various levels of detail through a technique known as hypertext. The customer can thus review a summary of specific information and at his request or command receive a level of information of greater detail. One such means of accomplishing the summoning of the representative would be to provide an icon or tool on the customer's monitor which he can press or select at any time which in turn causes the system to summon or ring a centrally or alternatively remotely located representative to personally assist the customer.

This system would be of great benefit to an employment agency or head hunter who might then record interviews with a selection of employee candidates for presentation purposes permitting prospective employers to browse the catalogue of candidates in quickly narrowing and finalizing their recruiting search.

The provider of the equipment can charge the customer a fee for use of the system and its services for which it can then provide the customer with a printed coupon, rebate or voucher for free goods or services, or an equivalent or partial discount should the customer purchase his goods or services at that remote location during an unlimited or limited future period of time.

In addition to accepting a credit card or similar means as payment for system use, the system could accept cash or any other payment means.

It is intended that the scope of the invention be limited not by this detailed description, but rather by the claims appended hereto.

What is claimed is:

1. An apparatus to market and/or sell goods and/or services over an electronic network comprising:
    a first computerized central communications facility adapted to be linked to a computerized remote facility and to a plurality of other computerized central communications facilities, each of said first or other computerized central communications facilities having information relating to goods or services stored in a database, and each of said first or other computerized central communications facilities having a processor programmed to:
    receive from a customer located at said computerized remote facility a request to at least one of search, browse and access in said database at said first or other computerized central communications facility for information of interest;
    enable said customer to at least one of search, browse and access said database for information of interest; and
    transmit said information of interest from the database at said computerized central communications facility to said computerized remote communications facility;
    wherein at least one of said computerized central communications facilities is adapted to provide to said customer at said computerized remote facility a list of computerized central communications facilities permitting said customer to select and contact at least one other computerized central communications facility to request additional information relating to said goods or services, and;
    wherein at least one of said computerized central communications facilities is further programmed to contact the customer and apprise said customer of goods or services offered or any special offerings.

2. An apparatus to market and/or sell goods and/or services over an electronic network comprising:
    a first computerized central communications facility adapted to be linked to a computerized remote facility and to a plurality of other computerized central communications facilities, each of said first or other computerized central communications facilities having information relating to goods or services stored in a database, and each of said first or other computerized central communications facilities having a processor programmed to:
    receive from a customer located at said computerized remote facility a request to at least one of search, browse and access in said database at said first or other computerized central communications facility for information of interest;
    enable said customer to at least one of search, browse and access said database for information of interest; and
    transmit said information of interest from the database at said computerized central communications facility to said computerized remote communications facility;
    wherein at least one of said computerized central communications facilities is adapted to provide to said customer at said computerized remote facility a list of computerized central communications facilities permitting said customer to select and contact at least one other computerized central communications facility to request additional information relating to said goods or services, and;
    wherein said processor is further programmed to download software from said computerized central communications facility to said remote communications facility, said software adapted to present information of interest to said customer.

3. An apparatus to market and/or sell goods and/or services over an electronic network comprising:
    a first computerized central communications facility adapted to be linked to a computerized remote facility and to a plurality of other computerized central communications facilities, each of said first or other computerized central communications facilities having information relating to goods or services stored in a database, and each of said first or other computerized central communications facilities having a processor programmed to:
    receive from a customer located at said computerized remote facility a request to at least one of search, browse and access in said database at said first or other computerized central communications facility for information of interest;
    enable said customer to at least one of search, browse and access said database for information of interest; and
    transmit said information of interest from the database at said computerized central communications facility to said computerized remote communications facility;
    wherein at least one of said computerized central communications facilities is adapted to provide to said customer at said computerized remote facility a list of computerized central communications facilities permitting said customer to select and contact at least one other computerized central communications facility to request additional information relating to said goods or services, and;
    wherein said processor is further programmed to download software from said computerized central communications facility to said remote communications facility, said software adapted to enable said customer to conduct a transaction using the information provided by said computerized central communications facility relating to goods or services.

4. An apparatus for marketing at least one of goods or services, comprising:
    a first central communications facility having a first database of information relating to goods or services to provide to a customer at a computerized remote facility upon request, said first central communications facility adapted to enable said customer to select and contact a second central communications facility having a database of information relating to a second set of information relating to goods or services to provide upon request; and a communication device to enable said first central communications facility to communicate with said remote facility said communication including transmitting said first set of information from said first central communications facility to said remote facility;

further comprising a software application for assisting the central communications facility to download a contract to the computerized remote location.

5. An apparatus for marketing at least one of goods or services, comprising:

a first central communications facility having a first database of information relating to goods or services to provide to a customer at a computerized remote facility upon request, said first central communications facility adapted to enable said customer to select and contact a second central communications facility having a database of information relating to a second set of information relating to goods or services to provide upon request; and a communication device to enable said first central communications facility to communicate with said remote facility said communication including transmitting said first set of information from said first central communications facility to said remote facility;

further comprising means for downloading software from the central communications facility to the computerized remote facility.

6. A method for electronically transacting goods or services between a customer at a remote location and a plurality of providers of goods or services comprising:

providing a first database associated with a first provider of goods or services and containing information relating to goods or services, said first database adapted to direct the customer at a remote location to a second database associated with a second provider of goods or services and containing information relating to goods or services; and enabling a remote facility to browse each of said first or second databases for information relating to goods or services;

further comprising providing an audio-visual presentation relating to said goods or services;

wherein said audio-visual presentation has the form of computerized voice.

7. A marketing apparatus for use with a distant communications apparatus including means for storing a digital image and a data record of a good for sale within said distant communications apparatus and a means for transmitting said digital image and data record to said marketing apparatus; said marketing apparatus comprising:

a communication means for communicating with said distant communications apparatus;

a processor operably connected to said communications means, said processor receiving the data record of a good for sale from said distant communications apparatus, said processor receiving an identification code from said distant communications apparatus;

a storage device operably connected to said processor, said storage device adapted to receive said data record of a good for sale, said data record containing an image of said good for sale and a written description of said good for sale;

presentation software operably connected to said storage device and a communications link, said presentation software providing , via said communications link, and interface to said marketing apparatus for a customer, thereby giving the customer access to said data record written description and said image of said good for sale;

a transaction processor operably connected to said communications link and said storage device, said transaction processor adapted to enable customer to tender payment, and to approve said payment means; and a transaction record means operably connected to said transaction processor, said transaction record means transmitting to said customer in response to said purchase request a record of said transaction.

8. The marketing apparatus of claim 7 wherein at least one of said apparatus is configured to provide auctioning services.

9. The marketing apparatus of claim 7 wherein at least one of said apparatus is configured to provide a coupon relating to said goods or services to said customer.

10. The marketing apparatus of claim 7 wherein at least one of said apparatus is configured to provide information about the sale or financing of vehicles.

11. The marketing apparatus of claim 7 wherein at least one of said computerized central communications facilities is configured to enable said customer to select and contact another computerized central communications facility.

12. The marketing apparatus of claim 7 wherein at least one of said apparatus is configured to contact said customer and apprise said customer of goods or services offered or any special offerings.

13. The marketing apparatus of claim 7 wherein at least one of said apparatus is configured to initiate contact with said customer.

14. An apparatus to market and/or sell goods or services over an electronic network comprising:

a first computerized central communications facility adapted to be linked to a computerized remote facility and to a plurality of other computerized central communications facilities, each of said first or other computerized central communications facilities having information relating to goods or services stored in a database, and each of said first or other computerized central communications facilities having a processor programmed to:

receive from a customer located at said computerized remote facility a request to at least one of search, browse and access in said database at said first or other computerized central communications facility for information of interest;

enable said customer to at least one of search, browse and access said database for information of interest; and transmit said information of interest from the database at said computerized central communications facility to said computerized remote communications facility;

wherein at least one of said computerized central communications facilities is adapted to provide said customer information regarding rentals.

15. The apparatus of claim 14 wherein said rentals are entertainment products.

16. The apparatus of claim 14 wherein at least one of said computerized central communications facilities is adapted to enable said customer to print said information.

17. The apparatus of claim 14 wherein at least one of said computerized central communications facilities is configured to enable said customer to select and contact another computerized central communications facility.

18. The apparatus of claim 14 wherein said rentals are travel rentals.

19. A method for running application software in a computer network environment, comprising:

providing at least one computerized remote communications facility and at least one computerized central communications facility coupled to said network environment, wherein said network environment is a hypermedia transmitted environment;

executing, at said computerized remote communications facility, browsing application software that processes a first transmitted hypermedia document to identify visual and/or audio information in said hypermedia document caused to be transmitted from said computerized central communications facility for a customer at said computerized remote communications facility;

utilizing said browsing application software to display, on a monitor at said computerized remote communications facility, at least a portion of a first transmitted hypermedia document received over said network from said computerized central communications facility, wherein a portion of said first hypermedia document is displayed within a first browsing application software window on said monitor at said computerized remote communications facility, wherein said computerized remote communications facility has downloaded application software from at least one of said computerized central communications facilities in a current or past session, wherein said browsing application software is operational to process information contained in said hypermedia document, and wherein said downloaded application software is operational to translate information contained in said transmitted hypermedia document in order to display in said first browsing application software window or otherwise reproduce said information at a computer for said customer at said computerized remote communications facility;

wherein at least one of said computerized central communications facilities is configured to provide a coupon relating to goods or services to said customer.

20. A method for running application software in a computer network environment comprising:

providing at least one computerized remote communications facility and at least one computerized central communications facility coupled to said network environment, wherein said network environment is a hypermedia transmitted environment;

executing, at said computerized remote communications facility, browsing application software that processes a first transmitted hypermedia document to identify visual and/or audio information in said hypermedia document caused to be transmitted from said computerized central communications facility for a customer at said computerized remote communications facility;

utilizing said browsing application software to display on a monitor at said computerized remote communications facility at least a portion of a first transmitted document received over said network from said computerized central communications facility, wherein a portion of said first hypermedia document is displayed within a first browsing application software window on said monitor at said computerized remote communications facility, wherein said computerized remote communications facility has downloaded application software from at least one of said computerized central communications facilities in a current or past session, wherein said browsing application software is operational to process information contained in said hypermedia document, and wherein said downloaded application software is operational to translate information contained in said transmitted hypermedia document in order to display in said first browsing application software window or otherwise reproduce said information at a computer for said customer at said computerized remote communications facility;

wherein at least one of said computerized central communications facilities is configured to provide auctioning services.

21. A method for running application software in a computer network environment, comprising:

providing at least one computerized remote communications facility and at least one computerized central communications facility coupled to said network environment, wherein said network environment is a hypermedia transmitted environment;

executing, at said computerized remote communications facility browsing application software that processes a first transmitted hypermedia document to identify visual and/or audio information in said hypermedia document caused to be transmitted from said computerized central communications facility for a customer at said computerized remote communications facility;

utilizing said browsing application software to display on a monitor at said computerized remote communications facility, at least a portion of a first transmitted hypermedia document received over said network from said computerized central communications facility, wherein a portion of said first hypermedia document is displayed within a first browsing application software window on said monitor at said computerized remote communications facility, wherein said computerized remote communications facility has downloaded application software from at least one of said computerized central communications facilities in a current or past session, wherein said browsing application software is operational to process information contained in said hypermedia document, and wherein said downloaded application software is operational to translate information contained in said transmitted hypermedia document in order to display in said first browsing application software window or otherwise reproduce said information at a computer for said customer at said computerized remote communications facility;

wherein at least one of said computerized central communications facilities is configured to enable said customer to select and contact another computerized central communications facility.

22. A method for running application software in a computer network environment, comprising:

providing at least one computerized remote communications facility and at least one computerized central communications facility coupled to said network environment, wherein said network environment is a hypermedia transmitted environment;

executing, at said computerized remote communications facility, browsing application software that processes a first transmitted hypermedia document to identify visual and/or audio information in said hypermedia document caused to be transmitted from said computerized central communications facility for a customer at said computerized remote communications facility;

utilizing said browsing application software to display, on a monitor at said computerized remote communications facility at least a portion of a first transmitted communications facility, wherein a portion of said first hyper media document is displayed within a first browsing application software window on said monitor at said computerized remote communications facility, wherein said computerized remote communications facility has downloaded application software from at least one of said computerized central communications facilities in a current or past session, wherein said browsing application software is operational to process information contained in said hypermedia document and wherein said downloaded application software is operational to translate information contained in said transmitted hypermedia document in order to display in said first browsing application software window or otherwise reproduce said information at a computer for said customer at said computerized remote communications facility;

wherein at least one of said computerized central communications facilities is configured to contact said customer and apprise said customer of goods or services offered or any special offerings.

23. A method for running application software in a computer network environment, comprising:
providing at least one computerized remote communications facility and at least one computerized central communications facility coupled to said network environment, wherein said network environment is a hypermedia transmitted environment;

executing, at said computerized remote communications facility browsing application software that processes a first transmitted hypermedia document to identify visual and/or audio information in said hypermedia document caused to be transmitted from said computerized central communications facility for a customer at said computerized remote communications facility;

utilizing said browsing application software to display, on a monitor at said computerized remote communications facility, at least a portion of a first transmitted hypermedia document received over said network from said computerized central communications facility, wherein a portion of said hypermedia document is displayed within a first browsing application software window on said monitor at said computerized remote communications facility, wherein said computerized remote communications facility has downloaded application software from at least one of said computerized central communications facilities in a current or past session, wherein said browsing application software is operational to process information contained in said hypermedia document, and wherein said downloaded application software is operational to translate information contained in said transmitted hypermedia document in order to display in said first browsing application software window or otherwise reproduce said information at a computer for said customer at said computerized remote communications facility;

wherein at least one of said computerized central communications facilities is configured to initiate contact with said customer.

24. A method for enabling a remote user to preview a portion of a pre recorded entertainment product from a network computerized central communications facility containing pre selected portions of different pre recorded entertainment products, using a computer, a computer display and a telecommunications link between the remote user's computer and the network computerized central communications facility, the method comprising the steps of:
a) using the remote user's computer to establish a telecommunications link to the network computerized central communications facility wherein the network computerized central communications facility comprises (i) a central computer coupled to a communications network for retrieving and transmitting the pre selected portion of the pre recorded entertainment product upon request by a remote user and (ii) a central storage device for storing pre selected portions of a plurality of different pre recorded entertainment products;
b) choosing at least one pre selected portion of the pre recorded entertainment products from said central computer;
c) receiving the chosen pre selected portion of the pre recorded products; and
d) interactively previewing the received chosen pre selected portion of the pre recorded entertainment product.

25. The method of claim 24 wherein the method further comprises the step of transmitting user identification data from the remote user's computer to the central host server thereby allowing the central host server to identify and track the user's progress through the network computerized central communications facility.

26. The method of claim 24 wherein said network comprises multiple computerized central communications facilities and wherein at least one of said computerized central communications facilities is configured to provide a coupon relating to said goods or services to said customer.

27. The method of claim 24 wherein said network comprises multiple computerized central communications facilities and wherein at least one of said computerized central communications facilities is configured to provide auctioning services.

28. The method of claim 24 wherein said network comprises multiple computerized central communications facilities and wherein at least one of said computerized central communications facilities is configured to provide information about the sale or financing of vehicles.

29. The method of claim 24 wherein said network comprises multiple computerized central communications facilities and wherein at least one of said computerized central communications facilities is configured to enable said customer to select and contact another computerized central communications facility.

30. The method of claim 24 wherein said network comprises multiple computerized central communications facilities and wherein at least one of said computerized central communications facilities is configured to contact said customer and apprise said customer of goods or services offered or any special offerings.

31. The method of claim 24 wherein said network comprises multiple computerized central communications facilities and wherein at least one of said computerized central communications facilities is configured to initiate contact with said customer.

32. An apparatus for marketing goods and/or services, comprising:
a computerized central communications facility providing information relating to goods and/or services to customers at a plurality of computerized remote facilities, each of said plurality of computerized remote facilities remote from and linked to said computerized central communications facility; and a database of information relating to said goods and/or services accessible to customers at said plurality of computerized remote facilities wherein said computerized central communications facility provides auctioning services including receipt of auction bids placed by customers from said plurality of computerized remote facilities.

33. An apparatus to market and/or sell goods or services over an electronic network comprising:

a first computerized central communications facility adapted to be linked to a computerized remote facility and to a plurality of other computerized central communications facilities, each of said first or other computerized central communications facilities having information relating to goods or services stored in a database, and each of said first or other computerized central communications facilities having a processor programmed to:

receive from a customer located at said computerized remote facility a request to at least one of search, browse and access in said database at said first or other computerized central communications facility for information of interest;

enable said customer to at least one of search, browse and access said database for information of interest; and transmit said information of interest from the database at said computerized central communications facility to said computerized remote communications facility;

wherein at least one of said computerized central communications facilities is adapted to provide said customer information regarding entertainment rentals.

34. The apparatus of claim 33 wherein said rentals are movie rentals.

35. The apparatus of claim 33 wherein at least one of said computerized central communications facilities is adapted to enable said customer to print said information.

36. The apparatus of claim 33 wherein at least one of said computerized central communications facilities is configured to enable said customer to select and contact another computerized central communications facility.

* * * * *

UNITED STATES PATENT AND TRADEMARK OFFICE
CERTIFICATE OF CORRECTION

PATENT NO. : 7,624,044 B2  Page 1 of 1
APPLICATION NO. : 08/650834
DATED : November 24, 2009
INVENTOR(S) : Stephen Wren

It is certified that error appears in the above-identified patent and that said Letters Patent is hereby corrected as shown below:

In the Specification:
At column 12, line 19-21, please delete the passage: "products. This gives the financial services company or other provider of goods and services more control over the sales process."

In the Claims:
At column 19, line 3 of claim 22, after "of a first transmitted": please insert --hypermedia document received over said network from said computerized central--
At column 19, line 43 of claim 23, after "said": please insert --first--
At column 21, line 3 of claim 32, after "facilities": please insert --;--

Signed and Sealed this

Twelfth Day of January, 2010

David J. Kappos
*Director of the United States Patent and Trademark Office*